United States Patent [19]
Matlock

[11] Patent Number: 5,116,179
[45] Date of Patent: May 26, 1992

[54] NAIL END PLATE FOR WOODEN TIES

[76] Inventor: Gordon E. Matlock, 554 Sappington Bridge Rd., Sullivan, Mo. 63080

[21] Appl. No.: 230,892

[22] Filed: Aug. 11, 1988

Related U.S. Application Data

[63] Continuation-in-part of Ser. No. 582,950, Feb. 23, 1984, abandoned.

[51] Int. Cl.⁵ ............................................. F16B 15/00
[52] U.S. Cl. ................................................. 411/466
[58] Field of Search .......... 238/29; 411/457, 461–468, 411/912; 52/514, DIG. 6

[56] References Cited

U.S. PATENT DOCUMENTS

| | | | |
|---|---|---|---|
| 272,685 | 2/1883 | Hart | 411/466 X |
| 988,620 | 4/1911 | Body | 238/29 |
| 1,324,483 | 12/1919 | Upson | |
| 1,593,408 | 7/1926 | Honigbaum | 411/461 X |
| 2,142,167 | 1/1939 | Zalkind | 411/461 |
| 2,208,848 | 7/1940 | Jorgensen | |
| 2,282,624 | 5/1942 | Upson | 411/466 |
| 2,282,631 | 5/1942 | Winsnip | 411/466 X |
| 2,339,841 | 1/1944 | Deuchler | 411/466 X |
| 3,016,586 | 1/1962 | Atkins | 411/466 |
| 3,068,738 | 12/1962 | Nulick | |
| 3,241,424 | 3/1966 | Moehlenpah | 85/13 |
| 3,322,018 | 5/1967 | Moehlenpah | 85/13 |
| 3,343,439 | 9/1967 | Koenigshof | |
| 3,362,277 | 1/1968 | Moehlenpah | |
| 3,417,651 | 12/1968 | Moehlenpah | 85/13 |
| 3,841,194 | 10/1974 | Moehlenpah | 85/13 |
| 3,948,011 | 4/1976 | Price et al. | 52/241 |
| 3,951,033 | 4/1976 | Moehlenpah | 85/13 |
| 4,209,265 | 6/1980 | Moehlenpah | 403/230 |

FOREIGN PATENT DOCUMENTS 705763 3/1965 Canada ............................ 238/29
966362 1/1964 United Kingdom ........... 411/457

Primary Examiner—Rodney M. Lindsey
Attorney, Agent, or Firm—Zarley, McKee, Thomte, Voorhees & Sease

[57] ABSTRACT

A nail end plate for wooden ties comprising a metal plate having a plurality of elongated teeth struck therefrom to create an opening in the plate. Each of the teeth are struck out less than 90° from the plate. The teeth are generally V-shaped in transverse cross-section. The openings are arranged in a plurality of alternating first and second rows. The openings in each of the first rows comprise a plurality of pairs of first and second openings with the openings in the second rows comprising a plurality of third and fourth openings. The first openings in the first row are longitudinally aligned with each other. The second openings in the first row are also longitudinally aligned with each other but are transversely off-set with respect to the first opening. The third openings in the second row are longitudinally aligned with each other. The fourth openings in the second rows are also longitudinally aligned with each other and are transversely off-set with respect to the third openings in the second row. The teeth in the first rows face a first direction while the teeth in the second rows face a direction opposite to the first direction. The teeth of the second openings cooperate with the teeth of the fourth openings to form a plurality of staples. The teeth of the third openings cooperate with the teeth of the first openings to also form a plurality of staples.

4 Claims, 1 Drawing Sheet

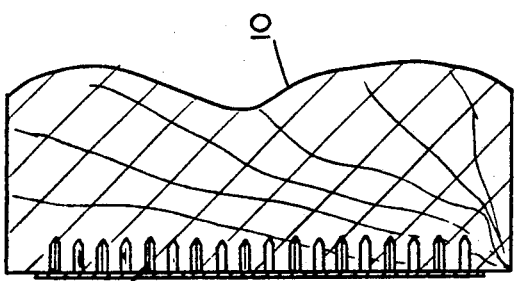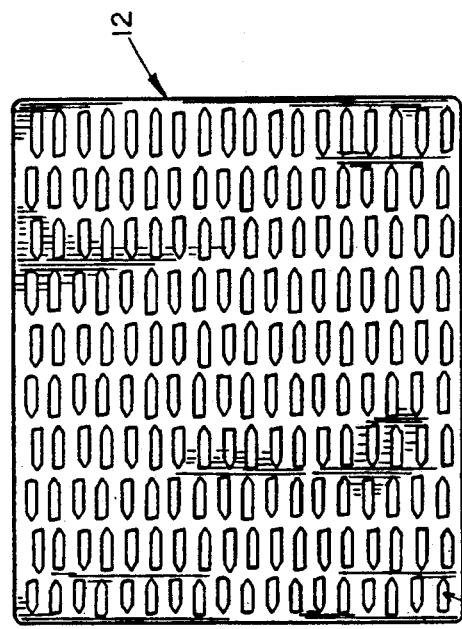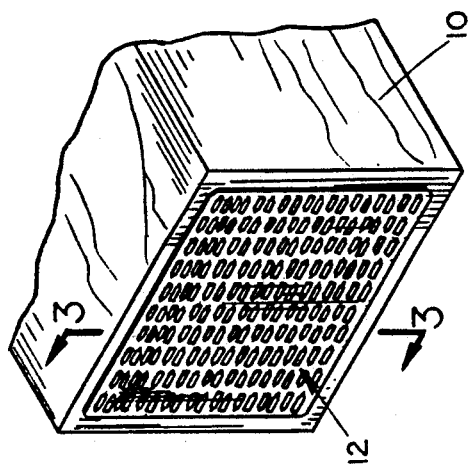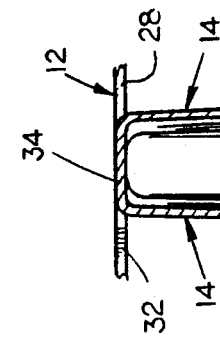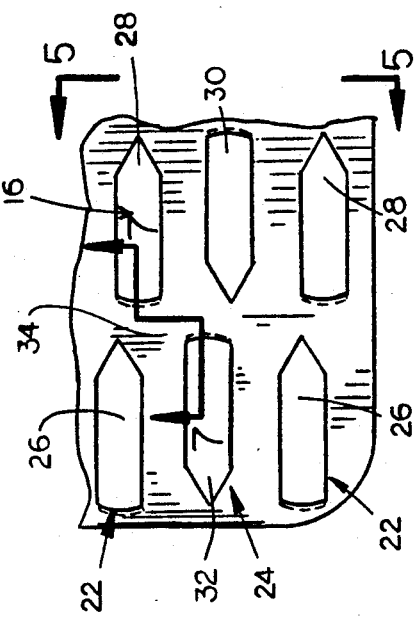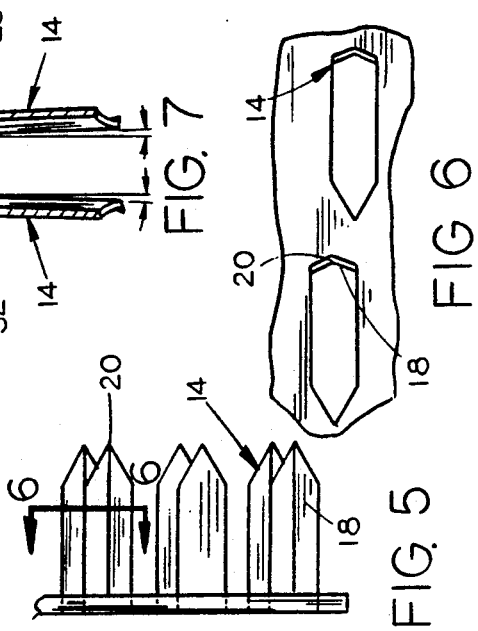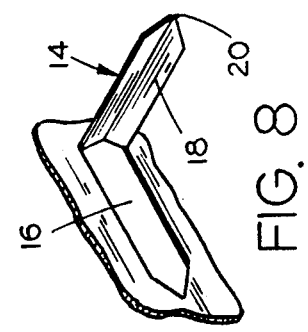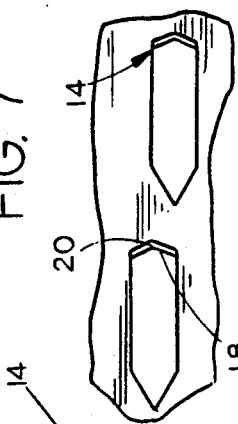

NAIL END PLATE FOR WOODEN TIES

CROSS-REFERENCE TO RELATED APPLICATION

This is a continuation-in-part patent application of U.S. Pat. application Ser. No. 582,950 filed Feb. 23, 1984 abandoned.

BACKGROUND OF THE INVENTION

This invention relates to a nail end plate and more particularly to a nail end plate for use with wooden ties.

Many types of connector plates have been previously described for fastening a pair of adjacent wooden members such as structural members in a roof truss or the like. The conventional connector plates are designed to be secured or penetrate into the longitudinal grain of the structural members.

Wooden ties such as cross ties are normally cut from green wood and are allowed to dry or cure prior to being used. The wooden ties frequently develop splits or cracks in the ends thereof which renders the cross tie unusable unless some means is provided to close the splits. Applicant has previously devised end plating machines for wooden ties which employ hydraulically operated platens which compress the ends of the tie to close the cracks therein. Nail plates are then driven into the ends of the compressed tie. When the pressing or squeezing pressure is released from the tie, the nail plates tend to maintain the ends of the tie in the closed position. In other words, the splits are prevented from reopening through the use of the nail plates. However, the nail plates previously available have been those types of plates used in the fabrication of roof trusses or the like. The nail plates of the prior art sometimes "work" out from the ends of the tie which cause the splits to reopen. Further, some of the conventional connector plates have been found to tear or split themselves.

U.S. Pat. No. 3,241,424 to Moehlenpah et al. discloses a prior art nail plate designed for use as a connector plate for trusses as opposed to a nail end plate for wooden ties. Applicant's invention will not perform as a truss connector plate and is not engineered or designed to function as a truss connector plate. Applicant's nail end plate as disclosed herein is designed for split control retention in hard wood cross ties and cannot be forced or pressed into soft structural wood members. Applicant's nail end plate will not drive into structural lumber and will physically collapse before fully penetrating the structural lumber.

Applicant's nail end plate differs from that of Moehlenpah and other types of truss connector plates since applicant's invention pertains to split control nail plates for application to wood cross ties that are driven into the end grain fibers of the cross tie. Truss connector and fastener plates such as that of Moehlenpah are engineered and invented for their intended use of fastening two structural lumber members connected together to present the longitudinal strength needed for such structural members used as trusses in the construction industry that must meet certain Truss Plate Institute specifications.

Applicant's invention as described herein represents many improvements over the prior art including the Moehlenpah '424 connector plate. When comparing the overall holding action of applicant's invention to the Moehlenpah '424 connector plate, it is readily apparent that it is impossible for the Moehlenpah plate to have smooth perimeters or edges. If the Moehlenpah plate is cut at various locations, a smooth perimeter would not be obtained. Applicant's invention is engineered and designed to provide a smooth, continuous perimeter for safety purposes. As used herein, a smooth, continuous perimeter or edge is defined as being without interruptions and without having any sharp corners. The perimeter of the Moehlenpah '424 connector plate is not smooth and continuous since it does have openings extending thereinto which create sharp edges thereby creating safety hazards. A further advantage to applicant's invention when considering the prior art such as the Moehlenpah '424 connector plate is that applicant's plate can be cut between rows of openings thereby making the plate narrower while still maintaining a smooth, continuous perimeter without any interruptions therein whatsoever.

Further, applicant's nail end plate results in a plate which leaves no open webs as in the prior art devices. The open webs in the prior art devices reduce their strength and holding power. Applicant's invention with the smooth perimeter and rounded corners presents a complete outer perimeter of strength which alone is deemed to be an improvement over the prior art patents in that additional strength is gained within a specified area. Applicant's invention also provides new and improved technology over the prior art since the design thereof results in a twin staple rotary action, action and reaction. Unlike prior art patents where the strength of one tooth is transmitted to the adjacent tooth for holding power, the twin tooth staple action of applicant's invention transmits holding power horizontally and angularly to every sixth tooth, thus providing a more even holding force and causing the twin staples to produce a rotary force of the invented tooth which reacts as a wedging effect of a twin staple trying to rotate about its force line axis, thus gripping and holding a constant tension of the teeth to the wood. The greater the opposing forces try to reopen the closed split in the cross tie, the more force is applied to the upper and lower twin staple, thus gripping the end grain tighter.

Numerous tests have been performed which demonstrate the superior holding and gripping power of applicant's invention for wood end grain use versus truss plates of the prior art. The plates of the prior art such as that in the Moehlenpah '424 patent tend to back out of the tie after the squeeze pressure has been released since they have no engineering qualities to maintain their position in end grain application. In fact, the tooth design of the Moehlenpah '424 device is detrimental because the shank root is larger than the shank portion of the tooth, thus creating a web-shape resistance before the plate is completely sealed flat against a tie end. This in itself is not suitable for end grain application as the web-shape tends to force the plate back out of the tie.

When squeezing pressure is removed from the tie and the tie is inserted beneath railroad track rails, the trains, which sometimes have flat spots on their wheels, produce a tremendous vibration that is transmitted to the railroad tie. A poorly designed plate will come loose and/or back out and release the split, which in some cases will cause the spikes securing the rail to the tie to loosen and thereby create a safety hazard.

Therefore, it is a principal object of the invention to provide an improved nail end plate for wooden ties.

A further object of the invention is to provide a nail end plate for wooden ties including teeth which are formed so as to positively maintain the end plate on the wooden tie.

A further object of the invention is to provide a nail end plate which has a plurality of teeth extending therefrom, with the teeth forming pairs of staples to positively maintain the end plate in the tie.

A further object of the invention is to provide a nail end plate having a design so that the load value is transmitted from pairs of teeth to adjacent pairs of teeth to aid in preventing the plate from failing.

A further object of the invention is to provide a nail end plate having a smooth, continuous perimeter with rounded corners which is uninterrupted by any openings extending thereinto thereby eliminating safety hazards.

Still another object of the invention is to provide a nail end plate having a design such that a plate may be cut to create a narrower end plate while still maintaining the smooth, continuous and uninterrupted perimeter thereof.

Yet another object of the invention is to provide a nail end plate which achieves twin staple rotary action, action and reaction.

These and other objects will be apparent to those skilled in the art.

BRIEF DESCRIPTION OF THE DRAWINGS

FIG. 1 is a perspective view illustrating the nail plate of this invention secured to a wooden tie;

FIG. 2 is a plan view of the nail end plate of this invention;

FIG. 3 is an enlarged sectional view seen on lines 3—3 of FIG. 1;

FIG. 4 is a partial elevational view of the nail end plate of this invention;

FIG. 5 is a sectional view seen on lines 5—5 of FIG. 4;

FIG. 6 is a sectional view seen on lines 6—6 of FIG. 5;

FIG. 7 is a sectional view seen on lines 7—7 of FIG. 4; and

FIG. 8 is a partial perspective view of one of the teeth of the nail end plate.

SUMMARY OF THE INVENTION

The nail plate of this invention is designed to be driven into the ends of a wooden tie such as a cross tie to prevent splits or cracks therein from reopening after the ends of the tie have been compressed and have the nail plate driven thereinto. The end plate is formed from a metal plate having a plurality of elongated teeth struck therefrom with each of the teeth being struck less than 90°, and preferably 88° so that the teeth extend from the plate less than transversely with respect thereto. The striking of the teeth from the plate creates a plurality of elongated openings arranged in alternating first and second rows. The openings in each of the first rows comprise alternating first and second openings while the openings in the second row comprise alternating third and fourth openings. Each of the teeth have a V-shaped cross section with the teeth in the first rows facing a first direction with the teeth in the second rows facing a direction opposite to that of the teeth in the first rows. The teeth of the openings cooperate with each other to form a plurality of staples or staple teeth which positively maintain the end plate in engagement with the end of the tie. The end plate is designed so that force is transmitted from one pair of teeth to adjacent pairs of teeth so that the plate will not fail when subjected to extreme tension. The fact that the teeth extend from the plate at approximately an 88° angle causes the teeth to be disposed in the end of a tie at less than a right angle to the plane of the end plate so that it will be more difficult to remove the end plate from the end of the tie due to the holding action of the "spread" staple teeth.

DESCRIPTION OF THE PREFERRED EMBODIMENT

Referring to the drawings, the numeral 10 designates a conventional wooden tie such as a cross tie or the like while the numeral 12 refers to the nail plate or nail end plate of this invention. A plurality of teeth 14 are struck from the plate 12 and extend from the plate from one side thereof to create an elongated opening 16. Each of the teeth 14 includes a shank portion 18 which is generally V-shaped in transverse cross section and a pointed tip 20. As best seen in FIG. 7, the teeth 14 are struck from the plate 12 less than 90° and preferably 88° so that the teeth dwell in a plane less than transverse to the plane of the body of the plate.

The openings 16 are arranged in a plurality of alternating rows 22 and 24. The openings in row 22 are comprised of a plurality of pairs of first and second openings 26 and 28 respectively. The openings 26 in row 22 are longitudinally aligned with each other. Likewise, the openings 28 in row 22 are longitudinally aligned with each other but are transversely offset with respect to openings 26.

The openings in row 24 are comprised of a plurality of pairs of third and fourth openings 30 and 32. Openings 30 in row 24 are in alignment with each other. Openings 32 in row 24 are in alignment with each other but are transversely offset with respect to openings 30. As seen in the drawings, the teeth created by the openings 26 and 28 face a direction opposite to the teeth in row 24.

The tooth of each opening 28 cooperates with a tooth in one of the openings 32 as illustrated in FIG. 7 to form a staple or staple tooth arrangement joined by the web portion 34. Similarly, the teeth of openings 30 cooperate with the teeth of openings 26 to also form pairs of staples interconnected by a web portion similar to that illustrated in FIG. 7.

In use, the nail end plate 12 is driven into the end of a tie 10 after it has been preferably compressed to close any cracks or splits therein. The end plate is driven into the end of the tie by a hydraulic ram means such as that described in my earlier three Pat. Nos. 4,494,685; 4,513,900; and 4,657,168. The fact that the teeth do not extend transversely from the plate causes the teeth to enter the end of the tie at an angle which tends to spread each of the pairs of teeth or staples outwardly as they are driven into the tie. The fact that the pairs of teeth are "spread" within the end of the tie aids in preventing the teeth from being pulled outwardly from the tie.

The teeth of the end plate are strategically located so as to connect through a web portion from one pair of teeth to another pair of teeth. This web is located on an angle from one pair of teeth to another pair of teeth. As previously stated, each set of staples is connected by a web or web portion so that load values will be transmitted from one pair of staples to the next pair of staples or teeth.

The webs interconnecting the pairs of teeth are positioned at angles with respect to each other thereby creating internal forces going horizontally and away from one another to attempt to cause the pairs of teeth to rotate. The radial force causes a vice-like action on the sides of the pair of teeth thus creating a constant holding force on the end of the tie.

Preferably, the plate is formed from 18 gauge steel with the teeth having a preferable length of 0.532 inches. Preferably, the distance between the openings in row 22 to the openings in row 24 is 0.325 inches. The width of each of the openings is preferably 0.147 inches.

Openings 26 are substantially vertically aligned with the openings 32 and the openings 28 are substantially vertically aligned with the openings 30. As used herein, substantially vertically aligned means that substantially the entire length of the openings 26 is vertically aligned with substantially the entire length of the openings 32. Similarly, substantially the entire lengths of the openings 28 are vertically aligned with substantially the entire lengths of the openings 30. The substantial vertical alignment of the openings 26 with the openings 32 and the openings 28 with the openings 30 is different than that of the Moehlenpah '424 structure since a large portion of the openings in Moehlenpah are laterally offset with openings adjacent thereto.

Further, applicant's invention herein differs from the prior art in that the alternating rows 22 are identical as are the alternating rows 32. Applicant's invention also differs from the prior art in that the web portions such as web portion 34 are angularly disposed which effect a twin tooth staple action.

Thus, it can be seen that a novel nail end plate has been provided for use with cross ties which accomplishes at least all of its stated objectives.

I claim:

1. A nail end plate for wooden ties comprising,
   a flat metal plate having first and second sides, a smooth, continuous top edge, a smooth, continuous bottom edge and smooth, continuous opposite side edges to provide a smooth, continuous perimeter without interruptions therein,
   said metal plate having a plurality of elongated teeth struck therefrom and extending from said second side,
   each of said teeth being formed by a struck-out portion of the plate creating an elongated opening in said plate the longitudinal axis of which is parallel to said top and bottom edges,
   each of said teeth being struck out less than 90° from said plate,
   said openings being arranged in alternating first and second rows extending parallel to said top and bottom edges,
   the openings in each of said first rows comprising a plurality of pairs of first and second openings,
   said first openings in said first row being longitudinally aligned with each other, said second openings in said first row being longitudinally aligned with each other and transversely offset with respect to said first opening in said first row,
   the openings in each of said second rows comprising a plurality of pairs of third and fourth openings;
   said third openings in each second row being longitudinally aligned with each other, said fourth openings in said second row being longitudinally aligned with each other and transversely offset with respect to said third openings in said second row,
   each of said teeth in said first row extending from one end of its respective opening,
   each of said teeth in said second row extending from the other end of its respective opening,
   each of said teeth including a shank portion extending from said plate and a tip portion on the end of said shank portion, said shank portion being generally V-shaped in transverse cross-section,
   said teeth in said first rows facing a first direction,
   said teeth in said second rows facing a second direction opposite to said first direction,
   said first openings in said first rows being substantially vertically aligned with said fourth openings in said second rows and said second openings in said first rows being substantially vertically aligned with said third openings in said second rows whereby the distance between said side edges may be changed by cutting said plate between said first and second openings and said third and fourth openings while still maintaining said continuous side edges,
   said teeth of said second openings cooperating with the teeth of said fourth openings to form a plurality of staples and wherein said teeth of said third openings cooperate with the teeth of said first openings to form a plurality of staples.

2. The plate of claim 1 wherein the corners of said metal plate are rounded.

3. The plate of claim 1 wherein said plate is generally rectangular.

4. A nail end plate for wooden ties, comprising,
   a flat metal plate having a plurality of elongated teeth struck therefrom and extending from one side thereof,
   said plate having a top edge, a bottom edge, and opposite side edges,
   each of said teeth being formed by a struck-out portion of the plate creating an elongated opening in said plate,
   said flat metal plate having rounded corners and uninterrupted, continuous edges to provide a smooth, continuous perimeter without interruptions therein.

* * * * *

UNITED STATES PATENT AND TRADEMARK OFFICE
CERTIFICATE OF CORRECTION

PATENT NO. : 5,116,179
DATED : May 26, 1992
INVENTOR(S) : GORDON E. MATLOCK

It is certified that error appears in the above-identified patent and that said Letters Patent is hereby corrected as shown below:

In column 6, lines 44-56, delete claim 4 in its entirety.

Signed and Sealed this

Twenty-third Day of March, 1993

Attest:

STEPHEN G. KUNIN

Attesting Officer

Acting Commissioner of Patents and Trademarks